(12) United States Patent  
Coombe

(10) Patent No.: US 6,234,046 B1
(45) Date of Patent: May 22, 2001

(54) RETENTION MECHANISM, PEDAL BODY AND SHOE CLEAT FOR A CLIPLESS BICYCLE PEDAL

(76) Inventor: William Blake Coombe, 5765 Arapahoe Ave. Suite B, Boulder, CO (US) 80303

( * ) Notice: Subject to any disclaimer, the term of this patent is extended or adjusted under 35 U.S.C. 154(b) by 0 days.

(21) Appl. No.: 09/298,657

(22) Filed: Apr. 23, 1999

(51) Int. Cl.[7] ....................................................... B62M 3/10
(52) U.S. Cl. ................................................................ 74/594.6
(58) Field of Search ............................ 74/594.6, 594.4; 36/131

(56) References Cited

U.S. PATENT DOCUMENTS

| 550,409   | * | 11/1895 | Hanson          | 74/594.6   |
|-----------|---|---------|-----------------|------------|
| 595,388   | * | 12/1897 | Hanson          | 74/594.6   |
| 4,298,210 | * | 11/1981 | Lotteau et al.  | 74/594.6 X |
| 4,686,867 |   | 8/1987  | Bernard         | 74/594.6   |
| 4,739,564 | * | 4/1988  | Eser            | 74/594.6 X |
| 4,882,946 |   | 11/1989 | Beyl            | 74/594.6   |
| 4,942,778 | * | 7/1990  | Bryne           | 74/594.6   |
| 5,325,738 | * | 7/1994  | Bryne           | 74/594.6   |
| 5,546,829 |   | 8/1996  | Bryne           | 74/594.6   |
| 5,553,516 |   | 9/1996  | Weiss           | 74/594.6   |
| 5,687,619 |   | 11/1997 | Bryne           | 74/594.6   |
| 5,699,699 |   | 12/1997 | Nagono          | 74/594.6   |
| 5,784,931 | * | 7/1998  | Ueda            | 74/594.6   |

FOREIGN PATENT DOCUMENTS

| 3315282 | * | 10/1984 | (DE) | 74/594.6 |
| 3329993 | * | 3/1985  | (DE) | 74/594.6 |
| 3426103 | * | 1/1986  | (DE) | 74/594.6 |

* cited by examiner

Primary Examiner—Mary Ann Green

(57) ABSTRACT

A retention mechanism for retaining a cycling shoe to a bicycle pedal, having a solid tongue and groove mechanism for engaging the shoe cleat to the pedal body. The shoe cleat having a forward ramp, and side walls, for guiding the cleat into engagement with the pedal body. Engagement being accomplished by, first, sliding the foot forward across the pedal body, bringing the rear tongue of the cleat into engagement with a mating groove the pedal body, then rotating the foot, out and back, about an axis perpendicular to the top surface of the pedal body, bringing the front tongue of the cleat fully into engagement with the pedal body.

1 Claim, 3 Drawing Sheets

RETENTION MECHANISM, PEDAL BODY AND SHOE CLEAT FOR A CLIPLESS BICYCLE PEDAL

FIELD OF THE INVENTION

The invention relates to bicycles and other human powered machines. More specifically to an improved retention mechanism, pedal body and shoe cleat for releasably coupling a cycling shoe to a bicycle pedal.

BACKGROUND OF THE INVENTION

"Clipless" types of bicycle pedals are being used by a growing number of cyclists for all types of riding. They offer improved comfort and hands free operation, over toe clips and straps, which were once more commonly used for retaining a cyclist's shoes to the pedals. Clipless pedal designs retain a cyclist's shoes to the pedals, without the use of toe clips and straps, by incorporating a form of retention mechanism, onto the pedal body, that engages a mating coupling adapter (commonly referred to as a shoe cleat), that is attached to, or made as an integral part of the sole of a cycling shoe.

With most clipless pedal systems, the cyclist attaches their shoe to the pedal, by locating their shoe cleat against the mating retention portion of the pedal, and then pressing forward, and/or down, with sufficient force to engage its resilient latching members. To release from the pedal, the cyclist rotates their foot (usually by twisting their heel away from the bicycle) a sufficient distance that causes the shoe to release from the pedal's retention mechanism. To avoid unintentional release, this rotational distance is set to be outside of the normal range of rotational movement that can naturally occur while cycling.

On all known current makes of clipless pedals, the pedal and the shoe cleat are coupled together with the use of at least one or more, resilient, spring or elastomer actuated, latching members. These are incorporated into either the pedal or the shoe cleat, depending on the particular system. Examples are described in the preferred embodiments of U.S. Pat. Nos. 4,686,867, 4,882,946, 4,942,778, 5,546,829, 5,687,619 and 5,699,699, which apply to currently available pedal systems. A serious disadvantage of all of these systems with resilient latching types of retention mechanisms, is that they are often unreliable and inconsistent to engage and disengage, and of the greatest concern, they are known to sometimes unintentionally release the cyclist's shoe from the pedal. The dangers of this cannot be overemphasized, because a cyclist could take a bad spill while having difficulty engaging or disengaging their pedals, and, in particular, the unintentional release of the cyclist's shoe from the pedal, could cause the cyclist to loose control of their bicycle, possibly with catastrophic results.

The difficulties with these resilient latching types of pedal system's retention mechanisms can occur for numerous reasons. For example, some systems are quite sensitive in design, and difficulties can arise if the shoe cleat is not properly fitted to the sole of the cycling shoe. This can be caused by a mismatch between the curvature of the sole of the shoe, and the mating shoe cleat, resulting in the shoe cleat being slightly deformed when it is attached to the shoe, adversely affecting its proper engagement with the pedal. This is particularly common with some system's which incorporate shoe cleats made from easily deformed, plastic materials. In other systems, the improper adjustment of the retention mechanism's spring tension, is often responsible for causing the system to function poorly. If the tension is set too low, for example, the shoe may inadvertently release from the pedal. Where as, if the spring tension is set too high, the cyclist may experience difficulty with, or be prevented from, engaging and/or disengaging their foot from the pedal. One of the most common causes of malfunctions with all of these pedal's retention mechanisms occurs when dirt and/or mud, etc., becomes lodged in some part of the spring/elastomer actuated components of their mechanisms, adversely affecting their proper function. The retention mechanisms described in U.S. Pat. Nos. 4,882,946, 4,942, 778 and 5,687,619, for example, are so easily impaired by foreign matter that they should only be used for cycling and walking on relatively clean, hard paved surfaces. This is not always possible, of course, and can be a real inconvenience to the cyclist. In fact, there are cases of some pedal system's retention mechanisms not functioning reliably even in the best of conditions.

U.S. Pat. No. 5,553,516 describes various forms, of a shoe cleat to pedal retention mechanism, that does not rely on the use of spring/elastomer actuated latches for engagement. Also, FIG. 10 of U.S. Pat. No. 5,546,829 shows such a system. Neither of these systems are in use today, however, as it is readily apparent to those familiar with the use of clipless pedal systems, that in actual practice, these systems would be very difficult, or nearly impossible, to engage. This is because they do not provide a means for quickly and simply locating the mating portions, of the pedal and the shoe cleat, adjacent to one another for engagement. It is essential in actual use, that a cyclist of average skill is able to easily locate, and quickly engage, the pedal's retention mechanism, using natural and repeatable movements of their feet. Though it is an obvious advantage to have a simpler and more reliable retention mechanism which is not dependent on foulable, spring or elastomer actuated latches for retention, no prior art has described a system which can be simply engaged and works satisfactorily in actual practice.

A desirable feature of many clipless pedal systems, is that they can automatically release the cyclist's shoes from the pedals in the event of an accident, etc. This occurs when the feet rotate far enough to a point, where it actuates the release mechanism of the pedal, thus freeing the shoe cleats and possibly preventing injury to the joints of the cyclist, were their shoes to remain fixed to the pedals. However, some makes of clipless pedals have the disadvantage of only releasing the feet when the heels are rotated towards the outside, and this can cause injury to the cyclist if one or both of their heels are twisted towards the inside of the bicycle and the pedals do not release. Therefore, it is advantageous to have both inward and outward releasing capability for maximum safety.

Another disadvantage of many clipless bicycle pedal systems, is that they tend to be designed, rather specifically, for either road or mountain cycling use, but generally not for both. This is a disadvantage to the cyclist, because many cyclists own and use, both road and mountain bicycles, as well as road and mountain cycling shoes. The difference being, that to facilitate improved walking, mountain biking shoes have a treaded sole with a recessed area that the shoe cleat is placed within; where as road shoes, in favor of high performance, lower profile and lighter weight, sacrifice convenient walking by eliminating the treaded, rubber sole. It would be advantageous to the cyclist to have a pedal system that was equally well suited for both road and mountain cycling use, thus enabling interchangeability of their shoes and bicycles, allowing them to choose the particular combination best suited for their present need.

Yet another disadvantage common to most clipless pedal systems, is the relatively large and undesirable distance that the cyclist's foot is placed above the pedal axle. This is caused by excessive height and thickness of the pedal body, its retaining mechanism, and/or its mating shoe cleat. U.S. Pat. Nos. 4,686,867 and 5,784,931 show a couple of examples of this. Designs of this type result in a loss of efficient energy transfer from the cyclist through the pedal, as well as decreased stability of the cyclist's foot on the pedal, due to its relatively higher center of gravity over the pedal axle. Additionally, the excessive height and protruding shape of many shoe cleats, particularly with some road pedal systems, makes walking difficult and uncomfortable. It would be advantageous to have a low profile pedal for increased efficiency and stability, as well as, a low profile shoe cleat for improved walking ability.

Still another disadvantage with many pedal systems is that they use plastics, or soft metal, in the pedal bodies and/or shoe cleats of their designs. This makes them more prone to damage and can cause them to wear out, or be worn down, rather quickly while riding, or especially, when walking on the shoe cleats. Additionally, because many shoe cleats locate onto the primary load bearing, top surface of the pedal body, with the same surface that contacts the ground while walking, the wear on the shoe cleats can adversely effect the proper functioning of their connection with the pedal. In fact, when the same surface of the shoe cleat that contacts the ground while walking is used to locate the cleat on the pedal, even cleats made from hard steel will cause problems as they wear down. It would be advantageous to have a shoe cleat made from a hard steel, or other wear resistant material that locates on the pedal with a recessed surface that does not normally contact the ground while walking.

A further disadvantage of the shoe cleats used with some clipless pedals, such as those seen in U.S. Pat. No. 5,546,829, is the relatively narrow width and the small contact area of the shoe cleat against the sole of the cycling shoe. The poor support afforded by these shoe cleats can cause unwanted sideways rolling of the cyclist's shoes, which is inefficient and can lead to injury. Also, they can cause uncomfortable, localized pressure points on the balls of the cyclist's feet, beneath which they are approximately located. It is advantageous to have a shoe cleat made of a rigid material having sufficient width and contact area with the shoe sole to provide good support to the cyclist's shoes/feet.

SUMMARY OF THE INVENTION

The object of the invention is to overcome the disadvantages of the prior art mentioned.

The invention is a low profile, clipless bicycle pedal system, incorporating a retention mechanism having a solid, reliable, simple to engage and disengage, tongue and groove retaining system. The cyclist uses a simple and natural sequence of movements to engage the shoe cleat to the pedal body.

The pedal body is made dual sided for simple locating, and, the shoe cleat incorporates a front ramp, and side walls for lateral guidance, that direct the pedal body into the recessed mating area of the shoe cleat during entry.

For the first step of engagement, the shoe cleat is slid across the pedal body with a natural forward and downward motion. The front ramp and the laterally guiding side walls of the shoe cleat, direct the cleat as it moves forward, so that, its rear tongue comes to a positive stop against the rear groove of the pedal body. At this point, the front tongue of the shoe cleat is resting on the top surface of the pedal body, directly above its mating groove, such that, by simply rotating the foot, with the heel in an out and back motion, the front tongue of the shoe cleat drops down, and is brought back, bringing it into engagement with its mating pedal groove. In this fully engaged position, the cyclist is able to apply downward force to the pedal, as well as, upward vertical pulling force to the pedal, without lifting off of the pedal. Also, the cyclist's feet are capable of rotating several degrees, in either direction, about an axis perpendicular to the top surface of the pedal body, without affecting their retention to the pedal, thus reducing stress to the cyclist's joints.

To release from the pedal, the cyclist simply rotates their foot sufficiently to bring the front tongue of the shoe cleat clear of the mating groove of the pedal body, before simply stepping off of the pedal.

The pedal body is made form a hard and wear resistant material, such as hardened steel, and it is shaped to shed dirt and mud easily, as well as to be aerodynamic. With the primary mating surfaces of the pedal body parallel to the ground, as they substantially are while being ridden by a cyclist, the mating grooves, which retain the shoe cleat's tongues, are located on the front and rear sides of the pedal body, so that the shoe cleat fits over and around the pedal body for engagement. This reduces the height of the shoe cleat between the top surface of the pedal and the shoe sole, advantageously bringing the cyclist's foot closer to the pedal spindle for maximum stability and efficiency.

The shoe cleat is made sufficiently broad and long to provide good support to the cyclist's foot, however, not so broad as to make it unable to be fitted into the recessed cleat area of a mountain cycling shoe. Therefore, it is suitable for both road and mountain cycling use. The surfaces of the shoe cleat, which engage the mating areas on the pedal body, are recessed into the cleat, where they are best protected from damage and the wear caused by walking. The recessed area of the shoe cleat is shallow and open in design, making it self cleaning of foreign matter, for reliable use in all types of conditions and varying terrains. The cleat is made of a strong and hard material for reliability, and is made low in profile for improved walkability.

The system provides positive and reliable retention of the shoe cleat to the pedal body, allowing free rotational movement of the foot about an axis perpendicular to the top surface of the pedal body, and provides for convenient walking. It is lightweight, aerodynamic, and simple to engage and disengage.

BRIEF DESCRIPTION OF THE DRAWINGS

FIGS. 3a–6b are successive right side and bottom views, which illustrate the sequential steps of engaging the shoe cleat to the pedal.

FIG. 3a is a right side view, showing a shoe with the cleat attached, as it would appear, moving towards the pedal for the first step of engagement.

FIG. 6b is the corresponding view of FIG. 6a, showing the shoe cleat in its fully engaged position with the pedal body.

DETAILED DESCRIPTION OF THE INVENTION

Figure 1:
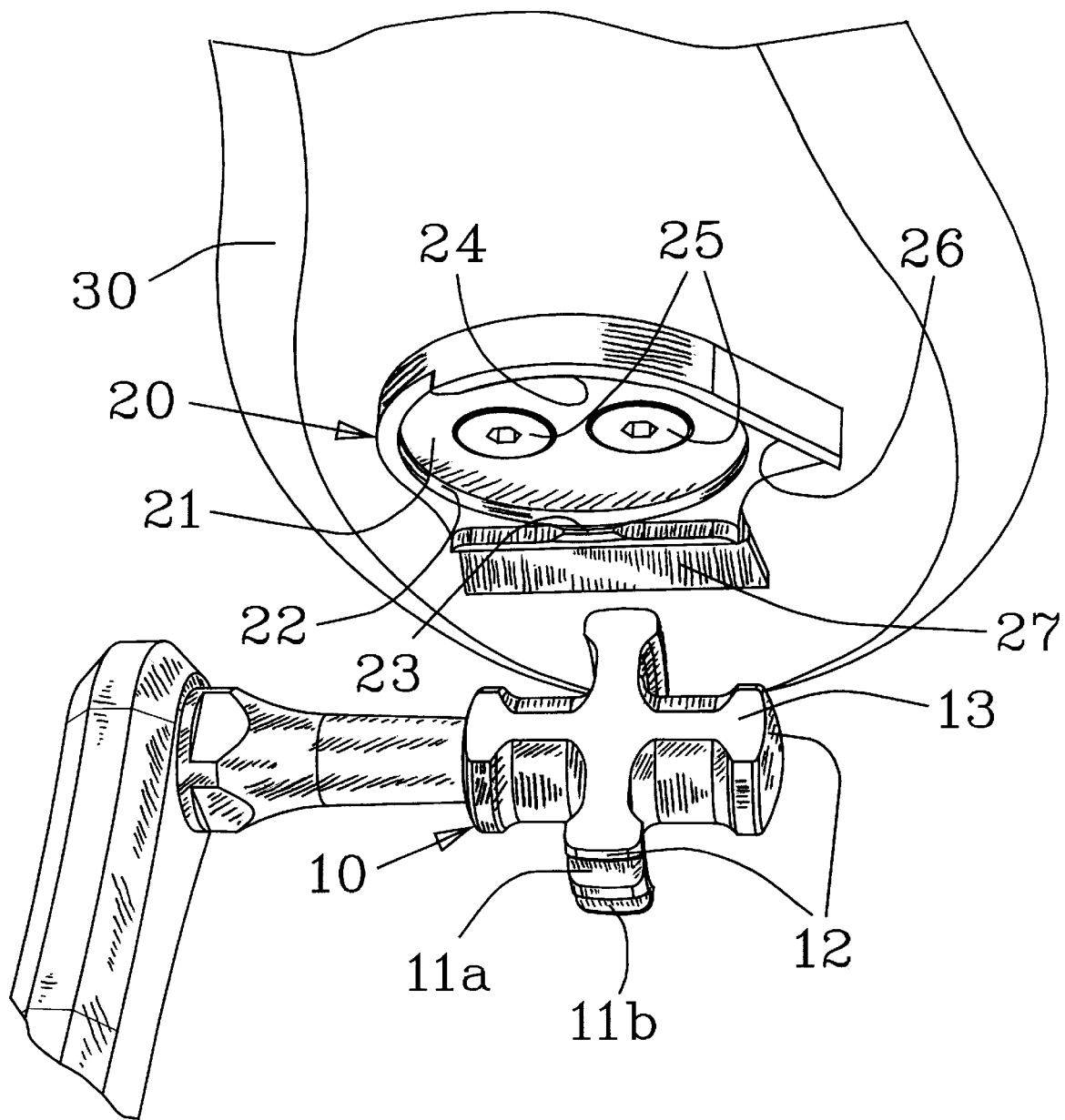
FIG. 1 is a perspective view from the right side, rear of a bicycle, showing the pedal and its mating shoe cleat, which is affixed to the sole of a cycling shoe.

As illustrated in FIGS. 1–6, the improved retention mechanism comprises a pedal body 10 and a mating shoe cleat 20. These are preferably made from a hardened steel alloy for maximum compactness and durability. However, they could be made from other types of material such as high strength plastics and lighter metals, if the size was scaled up sufficiently to compensate for the reduced strength and durability of these materials.

For simple entry and the longest life, the pedal body 10 is preferably two sided, with each side being an independent mirrored image of the other. For certain, very high level, competitive events, the pedal body could be made single sided for the lightest weight and highest aerodynamics.

The primary load bearing surfaces 13 of the pedal body 10 are shaped having four outer lobes, each spaced 90 degrees apart, which are connected by thinner sections that meet in the center to form a cross like shape. With the surfaces 13 parallel to the ground, as they substantially are when being ridden by a cyclist, the four lobes are positioned forward, rearward, inside and outside of the center of the pedal body. They form four, equally spaced wear pads along the peripheral of the pedal body, where the wear from the contact with the mating surface 21 of the shoe cleat 20 tends to be highest.

The pedal body 10 is sculpted and its surfaces 13 are thinned towards their centers to improve the ability of the pedal body 10 to force out mud and other debris which might get into the recessed area 21 of the shoe cleat 20. This serves to reduce weight as well.

Groove sets 11a and 11b are formed into the front and rearward sides of the pedal body, parallel to surfaces 13. They engage the mating tongues 23 and 24 of the shoe cleat 20. The top and bottom sides of the grooves 11a and 11b are angled for high strength, and include extra clearance beneath the area where the shoe cleat's tongues 23 and 24 engage them. This provides good mud clearing ability.

The shoe cleat 20 is attached to the sole of standard, two bolt pattern, road and mountain cycling shoes with screws 25. It comprises a ramped front section 27 which properly orients and guides the pedal body 10 into the cleats recessed area 21 during engagement. For the most consistent engagement, the front section 27 should extend far enough forward from the recessed area 21 of the cleat 20, to insure enough distance for the pedal body 10 to be able to roll over, 180 degrees, and still right itself in time to engage the recessed area. This is necessary because, in some instances, the front edge of the shoe cleat could catch on the pedal body, forcing it to roll over as the shoe moves forward, and possibly causing it to roll past the recessed area of the shoe cleat. The ramped front section 27 of the shoe cleat 20 could be made shorter, reducing weight, if the cleat was slightly recessed into the sole of the shoe, which would prevent the pedal body from possibly catching on the front edge of the cleat.

The inside wall 22 of the recessed area of the cleat 20 is preferably made circular, slightly larger in diameter than the corresponding guidance areas 12 on the pedal body 10. Two of these guidance areas 12, of which there are four per mating side of the pedal body, are clearly visible in FIG. 1. The front, rear and/or side contact areas of the inner wall 22 of the shoe cleat, and the corresponding areas 12 of the pedal body, could be shaped differently, having different radii, etc., as long as they all share a common center point about which the cleat can rotate relative to the pedal body. However, a circular wall with a diameter sufficient to aid in guiding the pedal body into the cleat recess 21 is the simplest and least expensive to manufacture.

Figure 2:
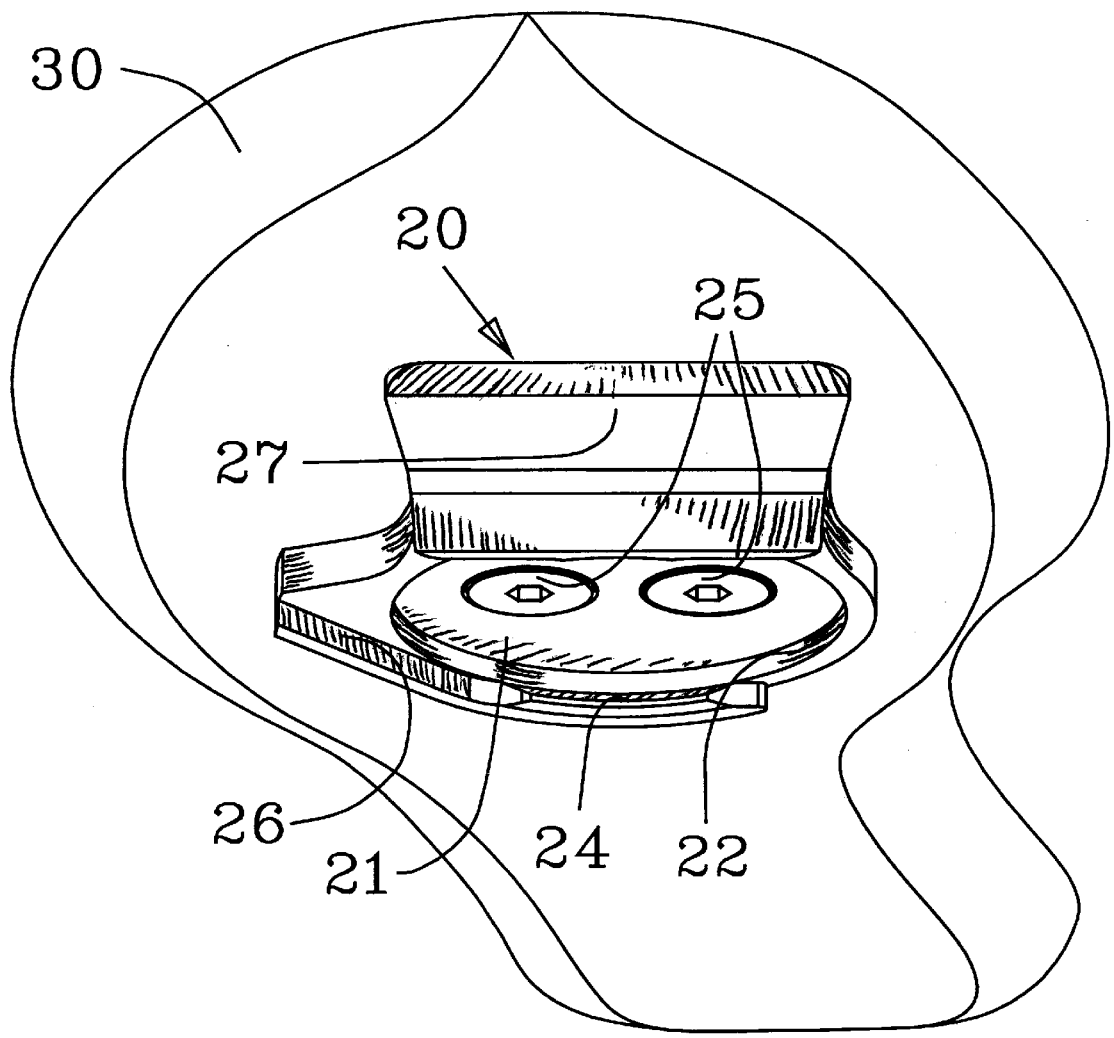
FIG. 2 is a perspective view from the front, looking up at the bottom of a cycling shoe and the attached shoe cleat.

The shoe cleat 20 incorporates two tongues, 23 and 24, which are placed to the front and rear of the recessed area 21, and engage with either of the two mating sets of grooves 11a and 11b of the pedal body. The rear tongue 24, clearly shown in FIG. 2, is made wider than the front tongue 23. It stays engaged, keeping the pedal body and shoe cleat properly positioned, as the foot is rotated to bring the front tongue 23 into position for its engagement, FIG. 5b.

The guidance ramp 26 of the shoe cleat serves two functions. It aids in guiding the pedal body 10 into the recessed area 21 of the shoe cleat 20, in the event that the foot is offset laterally, closer to the bicycles crankarms, as it moves forward over the pedal body; and, it also serves to properly position the cleat, relative to the pedal body, when the shoe is rotated during the final step of the engagement process, FIG. 5b.

Figure 3A:
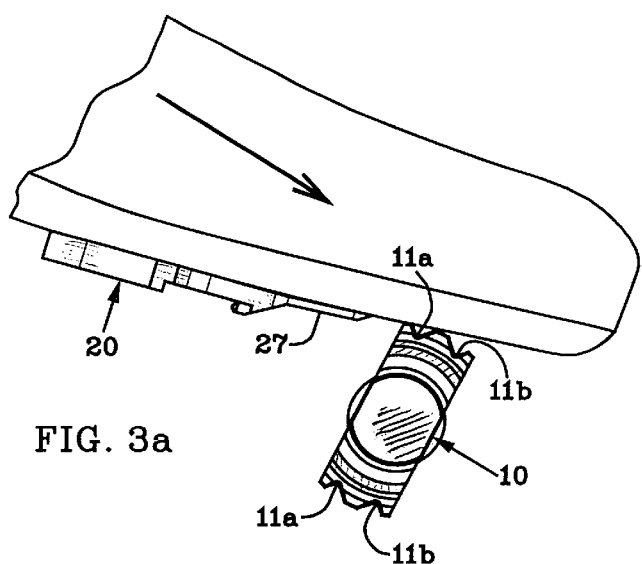
Figure 3B:
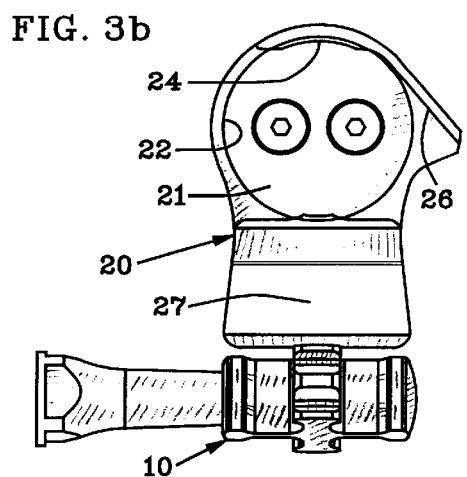
FIG. 3b is the corresponding bottom view of FIG. 3a, showing the cleat as it moves towards the pedal for engagement.
Figure 4A:
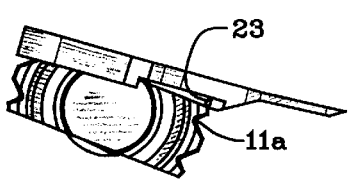
FIG. 4a a right side view, showing the shoe cleat with its rear tongue engaged in the rear groove of the pedal body.
Figure 4B:
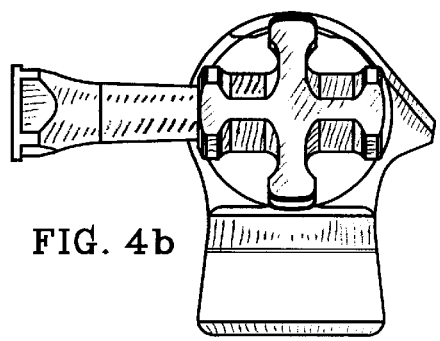
FIG. 4b is the corresponding bottom view of FIG. 4a, showing the rear portion of the shoe cleat engaged to the pedal.
Figure 5A:
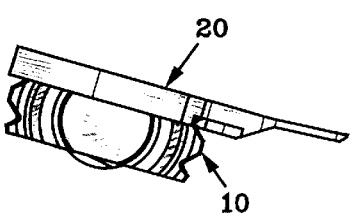
FIG. 5a is a right side view, showing the rotated shoe cleat, lying flush against the pedal.
Figure 5B:
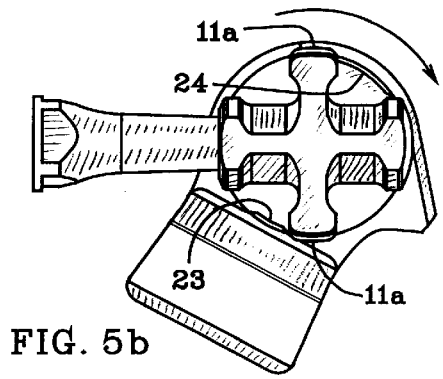
FIG. 5b is the corresponding bottom view of FIG. 5a, showing the shoe cleat in its rotated position, relative to the pedal, prior to complete engagement.
Figure 6A:
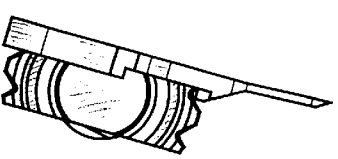
FIG. 6a is a right side view, showing the shoe cleat fully engaged with the pedal body.
Figure 6B:
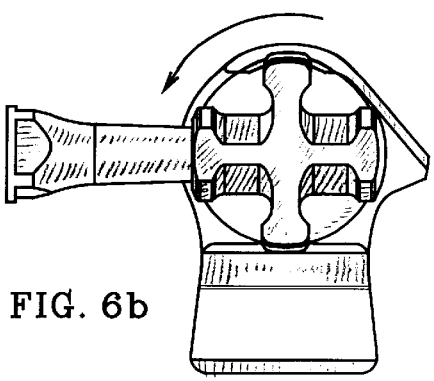

Referring to the sequential views 3a–6b, to engage the shoe cleat to the pedal: the foot is slid with a natural forward and downward motion, across the pedal body, as shown in FIGS. 3a and 3b. As it moves forward, the front ramp 27 orients the pedal body, so that it is in proper alignment when entering the recessed area 21 of the shoe cleat 20. The cleat's side wall 22 and the side guidance ramp 26 laterally guide the cleat as the pedal body 10 moves towards the rear of the recessed area 21 of the shoe cleat. The shoe cleat comes to a stop when its rear tongue engages one of the pedal's grooves 11a. In this position, FIGS. 4a and 4b, the cleat's front tongue 23 rests on the top surface of the pedal body 10 above its mating groove 11a. From this position, the foot is rotated, heel outwards, as shown in FIGS. 5a and 5b, bringing tongue 23 clear of the top surface of the pedal body 10, and allowing the pedal body to move fully into the recessed area of the shoe cleat. As shown in FIGS. 6a and 6b, the foot is then rotated back to its natural riding position with both tongues 23 and 24 now fully engaged with grooves 11a of the pedal body.

The motions involved with engaging the retention mechanism are simple and natural movements to perform, and, they have a self cleaning action that forces out mud and any other debris which may be on the mating surfaces prior to engagement.

In the fully engaged position, as shown in FIGS. 6a and 6b, the cyclist's feet can freely rotate several degrees in either direction from the central position, reducing stress to their joints, as can occur with fixed types of retention mechanisms. The cleat remains securely attached to the pedal, throughout this range of free rotation, where some portion of the cleat's tongue 23 remains within the mating groove 11a of the pedal body.

When desired, the cyclist can quickly and easily release from the pedal, by simply rotating their foot sufficiently, in an inward or outward direction, to bring the tongue 23 clear of the front groove 11a, before lifting their foot from the pedal. Unlike other pedal systems, there is no spring tension that a tired cyclist might have difficulty over coming, nor is there any complex mechanism that may become jammed, making release difficult or impossible.

While preferred embodiments of the invention have been described using specific terms, such description is for illustrative purposes only, and it is to be understood that changes and variations may be made without departing from the spirit or scope of the invention, which is defined in the following claims.

What is claimed is:

1. A shoe to pedal retention system comprising:

a pedal body having at least one primary load bearing surface; the pedal body having forward, rearward, inward, and outward sides oriented on planes running substantially perpendicular to the primary load bearing surface, the forward and rearward sides each having at least one groove running substantially parallel to the plane of the primary load bearing surface;

a cleat adapted to be fixed to a cycling shoe, the cleat having a recessed portion for receiving the pedal body, the cleat having forward and rearward tongues immovably fixed therewith for engagement with the grooves of the pedal body, the cleat having a front guidance ramp for orienting the pedal body and a side guidance ramp in communication with the recessed portion for rotationally guiding the pedal body into the recessed portion of the cleat.

\* \* \* \* \*